United States Patent
West et al.

(10) Patent No.: US 12,463,268 B2
(45) Date of Patent: Nov. 4, 2025

(54) VOLUME FILLER FOR IMMERSION COOLING BATTERY ARRAY DESIGNS

(71) Applicant: Ford Global Technologies, LLC, Dearborn, MI (US)

(72) Inventors: Liam E. West, Ferndale, MI (US); Nathan Lee, Novi, MI (US); Wen Dai, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 494 days.

(21) Appl. No.: 18/095,685

(22) Filed: Jan. 11, 2023

(65) Prior Publication Data

US 2024/0234857 A1 Jul. 11, 2024

(51) Int. Cl.
| | |
|---|---|
| H01M 10/653 | (2014.01) |
| B60L 58/26 | (2019.01) |
| H01M 10/613 | (2014.01) |
| H01M 10/6555 | (2014.01) |
| H01M 10/6557 | (2014.01) |

(52) U.S. Cl.
CPC ........... *H01M 10/653* (2015.04); *B60L 58/26* (2019.02); *H01M 10/613* (2015.04); *H01M 10/6555* (2015.04); *H01M 10/6557* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 4,174,014 A * | 11/1979 | Bjorksten | H01M 50/293 180/68.5 |
| 5,158,841 A | 10/1992 | Mennicke et al. | |
| 6,566,004 B1 | 5/2003 | Fly et al. | |
| 8,530,069 B2 | 9/2013 | Wood et al. | |
| 9,919,608 B2 | 3/2018 | Wang et al. | |
| 10,000,126 B2 | 6/2018 | Lei et al. | |
| 2011/0162820 A1* | 7/2011 | Weber | H01M 10/625 165/104.19 |
| 2011/0206948 A1* | 8/2011 | Asai | H01M 10/617 429/7 |
| 2020/0044204 A1* | 2/2020 | Lee | H01M 50/103 |
| 2020/0136209 A1* | 4/2020 | Dede | H01M 10/6563 |
| 2020/0220132 A1* | 7/2020 | Bourke | B60L 58/25 |
| 2021/0057791 A1* | 2/2021 | Harugaichi | B60L 50/66 |
| 2022/0285753 A1* | 9/2022 | Rainville | B64U 20/98 |

FOREIGN PATENT DOCUMENTS

| | | |
|---|---|---|
| CN | 210866420 U | 6/2020 |
| CN | 107039703 B | 11/2021 |
| CN | 114175360 A | 3/2022 |
| DE | 102012220537 B4 | 1/2022 |
| WO | 2020100152 A1 | 5/2020 |
| WO | 2022055466 A1 | 3/2022 |

* cited by examiner

*Primary Examiner* — Scott J. Chmielecki
(74) *Attorney, Agent, or Firm* — David B. Kelley; Carlson, Gaskey & Olds, P.C.

(57) ABSTRACT

This disclosure relates generally to battery packs for electrified vehicles, and in particular relates to a volume filler for immersion cooled battery arrays. In some aspects, the techniques described herein relate to a battery pack, including: an enclosure assembly defining a volume; a battery array within the volume, wherein the battery array includes a plurality of battery cells; and a volume filler within the volume, wherein the volume filler is disposed on a side of the battery array.

18 Claims, 4 Drawing Sheets

US 12,463,268 B2

VOLUME FILLER FOR IMMERSION COOLING BATTERY ARRAY DESIGNS

TECHNICAL FIELD

This disclosure relates generally to battery packs for electrified vehicles, and in particular relates to a volume filler for immersion cooled battery arrays.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

A high voltage battery pack typically powers the electric machines and other electrical loads of the electrified vehicle. The battery pack includes a plurality of battery cells and various other battery internal components that support electric propulsion of electrified vehicles.

The battery cells generate heat during charging and discharging operations. This heat must be dissipated in order to achieve a desired level of battery performance. Heat exchanger plates, sometimes referred to as "cold plates," are often employed to dissipate the heat generated by the battery cells.

SUMMARY

In some aspects, the techniques described herein relate to a battery pack, including: an enclosure assembly defining a volume; a battery array within the volume, wherein the battery array includes a plurality of battery cells; and a volume filler within the volume, wherein the volume filler is disposed on a side of the battery array.

In some aspects, the techniques described herein relate to a battery pack, wherein the volume filler is made of a closed cell foam.

In some aspects, the techniques described herein relate to a battery pack, wherein the volume filler is made of a closed cell metal foam.

In some aspects, the techniques described herein relate to a battery pack, wherein the battery array is a first battery array, and wherein a second battery array is within the volume.

In some aspects, the techniques described herein relate to a battery pack, wherein the first battery array is vertically above the second battery array.

In some aspects, the techniques described herein relate to a battery pack, wherein: the volume filler is a first volume filler and is arranged on a first side of the first and second battery arrays, and the battery pack includes a second volume filler arranged on a second side of the first and second battery arrays.

In some aspects, the techniques described herein relate to a battery pack, wherein: the battery pack includes a third volume filler arranged on the first side of the first and second battery arrays and vertically beneath the first volume filler, the battery pack includes a fourth volume filler arranged on the second side of the first and second battery arrays and vertically beneath the second volume filler, the first and third volume fillers are spaced-apart from the first side of the first and second battery arrays to provide a first space for coolant to flow, and the second and fourth volume fillers are spaced-apart from the second side of the first and second battery arrays to provide a second space for coolant to flow.

In some aspects, the techniques described herein relate to a battery pack, wherein the battery array is configured to permit fluid to flow from the first space to the second space.

In some aspects, the techniques described herein relate to a battery pack, wherein: the battery pack includes a plurality of thermal exchange plates arranged between some of the battery cells within the first and second battery arrays, and the thermal exchange plates include channels configured to permit fluid to flow from the first space to the second space.

In some aspects, the techniques described herein relate to a battery pack, wherein: the first and second battery arrays are arranged such that there are voids adjacent tops or bottoms of the battery cells within the first and second battery arrays, and the voids to permit fluid to flow from the first space to the second space.

In some aspects, the techniques described herein relate to a battery pack, wherein: the enclosure assembly includes a first portion and a second portion connected to the first portion, and the first portion and the second portion each include a main section, an angled section projecting from an edge of the main section, and a rim projecting from an edge of the angled section.

In some aspects, the techniques described herein relate to a battery pack, wherein the first portion and the second portion are connected by welding respective rims to one another.

In some aspects, the techniques described herein relate to a battery pack, wherein the first, second, third, and fourth volume fillers exhibit a triangular cross-section.

In some aspects, the techniques described herein relate to a battery pack, wherein the first, second, third, and fourth volume fillers exhibit a length substantially equal to a length of the first and second battery arrays.

In some aspects, the techniques described herein relate to a battery pack, wherein the first and third volume fillers are arranged to fill a majority of a volume defined by the angled sections of the first and second portions on the first side of the first and second battery arrays.

In some aspects, the techniques described herein relate to a battery pack, wherein the second and fourth volume fillers are arranged to fill a majority of a volume defined by the angled sections of the first and second portions on the second side of the first and second battery arrays.

In some aspects, the techniques described herein relate to a method, including: communicating fluid through a volume within an enclosure assembly of a battery pack to thermally condition a battery array, wherein the battery array is within the volume, and wherein a volume filler is within the volume.

In some aspects, the techniques described herein relate to a method, wherein the volume filler is made of a closed cell foam.

In some aspects, the techniques described herein relate to a method, wherein the volume filler is made of a closed cell metal foam.

In some aspects, the techniques described herein relate to a method, wherein the battery array is a first battery array, and wherein a second battery array is within the volume.

DETAILED DESCRIPTION

This disclosure relates generally to battery packs for electrified vehicles, and in particular relates to a volume filler for immersion cooled battery arrays. Among other benefits, which will be appreciated from the below description, this disclosure evenly distributes coolant relative to the cells of a battery array, which provides uniform heat transfer amongst the cells and leads to efficient heat transfer within the battery array.

Figure 1:
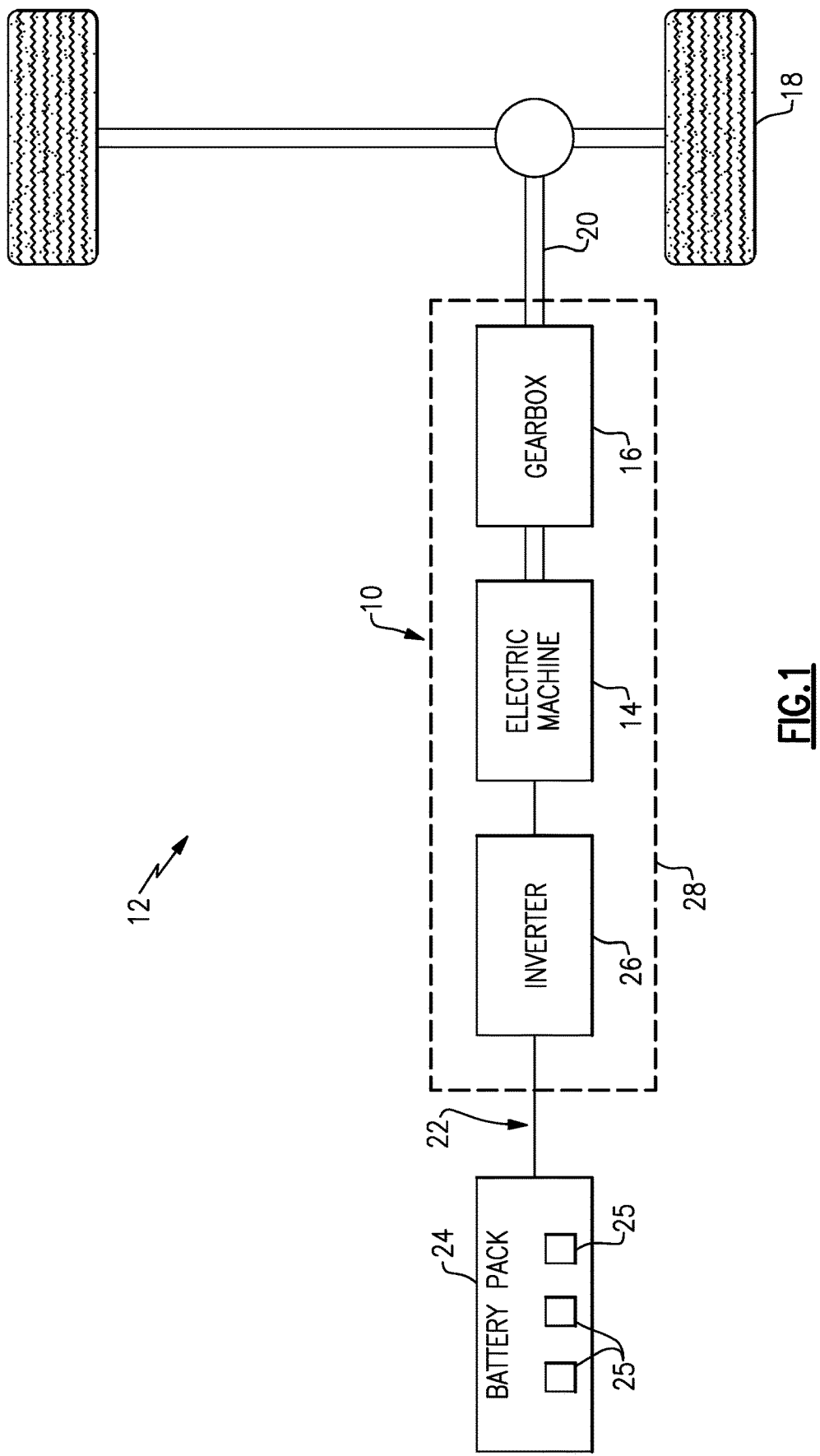
FIG. 1 schematically illustrates an example powertrain of an electrified vehicle.

FIG. 1 schematically illustrates a powertrain 10 of an electrified vehicle 12. Although depicted as a battery electric vehicle (BEV), it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The powertrain 10 shown in FIG. 1 is highly schematic and is not intended to limit this disclosure. Various additional components could alternatively or additionally be employed by the powertrain 10 within the scope of this disclosure.

Figure 2:
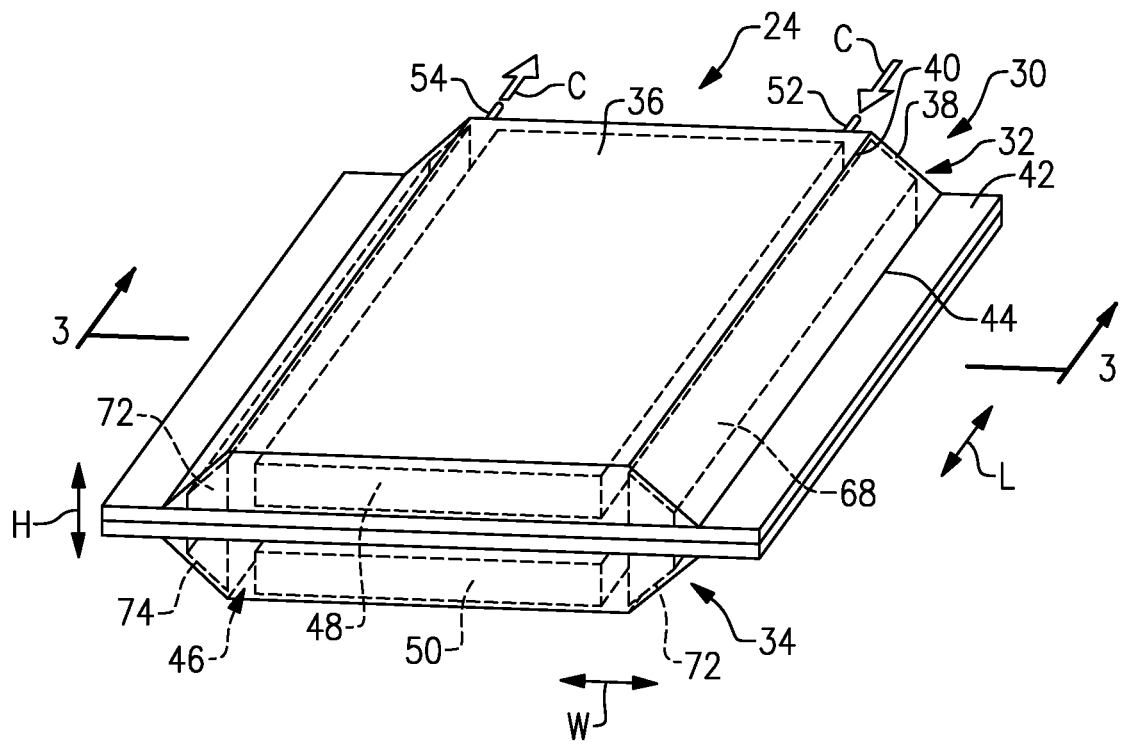
FIG. 2 is a perspective view of an example battery pack.

FIG. 2 illustrates additional detail of the example battery pack 24. In this example, the battery pack 24 includes an enclosure assembly 30. The enclosure assembly 30 includes a first portion 32, which here is a top portion or cover, and a second portion 34, which here is a bottom portion or tray. While the first portion 32 is vertically above the second portion 34, in this example, the first portion 32 could be arranged below, or to a side of the second portion 34. Various terms such as "above," "below," "top," and "bottom" are used relative to the arrangement of the battery pack 24 in the various drawings and should not otherwise be deemed limiting.

In this example, the first portion 32 includes a substantially planar main section 36, an angled section 38 projecting toward the second portion 34 from an edge 40 of the main section 36 at a non-perpendicular angle relative to the main section 36, and a rim 42 projecting outward from an edge 44 of the angled section 38. The rim 42 is substantially parallel to the main section 36. The first portion 32 exhibits this arrangement about an entire perimeter of the first portion 32, in this example. The second portion 34 is sized and shaped substantially similar to the first portion 32. The first and second portions 32, 34 may be formed of a metallic material using a stamping process, for example.

The first and second portions 32, 34 are welded to one another by welding the respective rims 42 to one another. While welding is mentioned, the first and second portions 32, 34 could be connected using other fluid-tight connection techniques, such as using adhesive. Further, while an exemplary enclosure assembly 30 is shown in the drawings, the enclosure assembly 30 may vary in size, shape, and configuration within the scope of this disclosure.

The enclosure assembly 30 exhibits a length L, width W, and height H. The length L may extend parallel to a centerline of the electrified vehicle 12. The width W may extend substantially across an entire width of the electrified vehicle 12.

Figure 3:
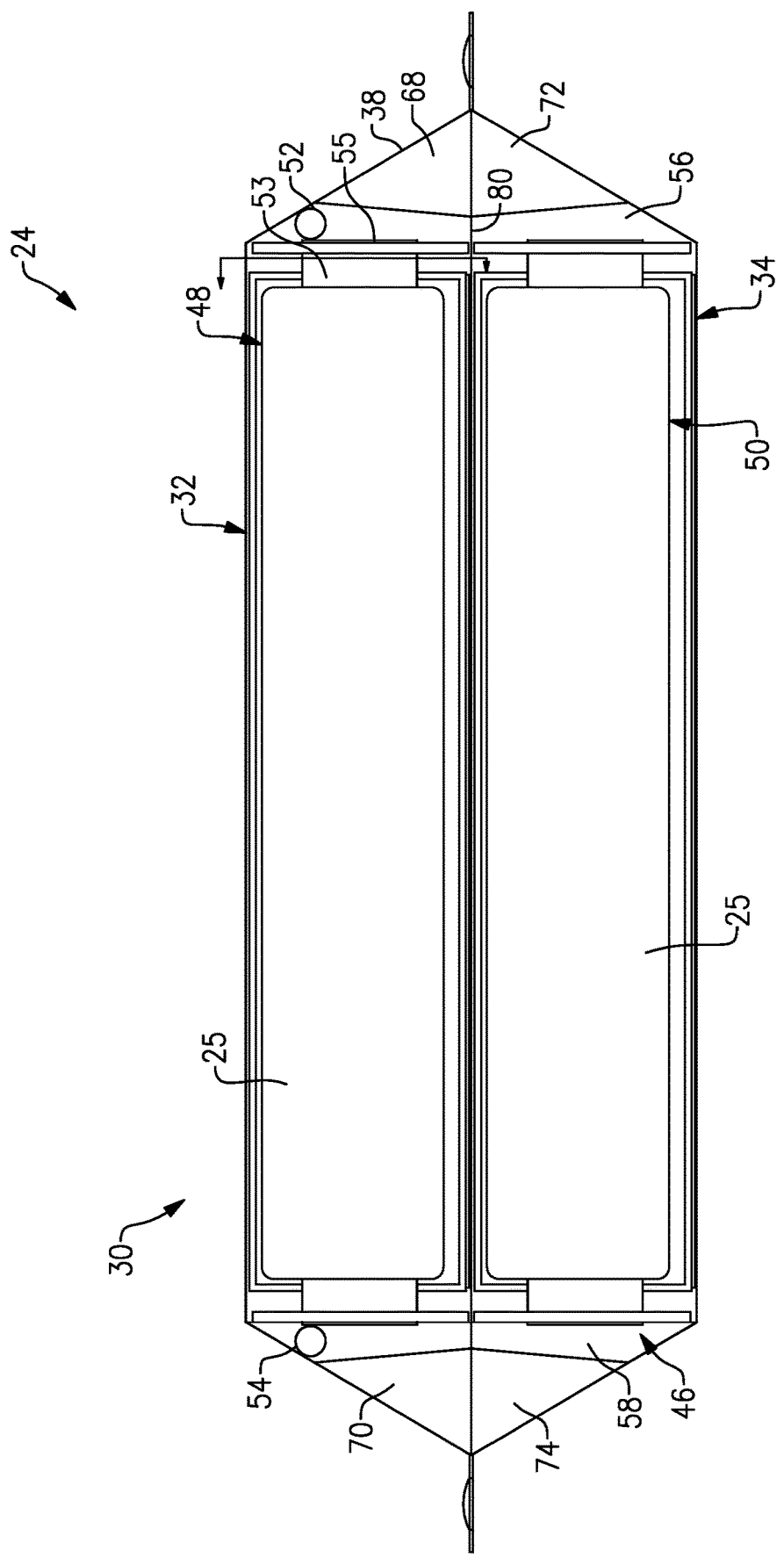
FIG. 3 is a cross-sectional view of the example battery pack, taken along line 3-3 from FIG. 2, and illustrates an example arrangement of battery arrays and volume fillers.

With joint reference to FIGS. 2 and 3, the enclosure assembly 30 defines a volume 46, which is specifically an inner volume of the enclosure assembly 30. Within the volume 46, the enclosure assembly 30 encloses a first battery array 48 and a second battery array 50 vertically below the first battery array 48. While two battery arrays are shown, this disclosure extends to battery packs with one or more arrays.

The battery pack 24 is configured to direct non-conductive coolant C relative to the first and second battery arrays 48, 50 to thermally condition the first and second battery arrays 48, 50, such as by absorbing heat from the first and second battery arrays 48, 50. The enclosure assembly 30 includes an inlet 52, which in this example is formed in the first portion 32 on a first side of the first and second battery arrays 48, 50, and an outlet 54, which in this example is formed in the first portion 32 on a second side of the first and second battery arrays 48, 50. Various fluid couplings may be provided relative to the inlet 52 and outlet 54.

The coolant C may be referred to as thermal exchange fluid. In this example, the coolant C generally flows from the inlet 52 to the outlet 54. Specifically, the coolant C generally flows from the inlet 52, into a first space 56 on a first side (i.e., the right-hand side in FIG. 3) of the first and second battery arrays 48, 50, around the battery cells 25 toward a second space 58 on an second, opposite side (i.e., the left-hand side in FIG. 3) of the first and second battery arrays 48, 50, and ultimately to the outlet 54.

Figure 4:
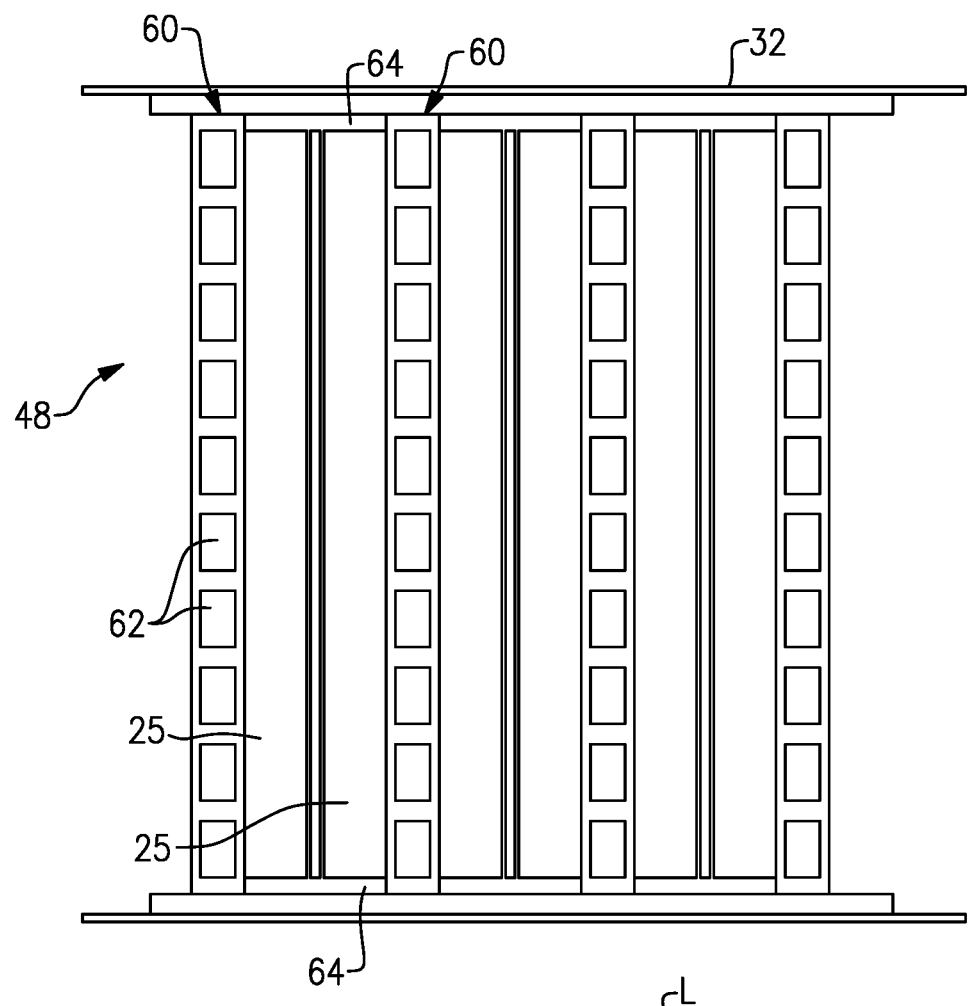
FIG. 4 is a side view of a portion of the battery pack and illustrates an exemplary arrangement of the battery cells relative to thermal exchange plates.

In this disclosure, the first and second battery arrays 48, 50 of battery cells 25 are generally stacked face-to-face. The battery pack 24 could employ any number of battery cells 25 within the scope of this disclosure. As shown in FIG. 4, in one example, every two battery cells 25 are spaced-apart by a thermal exchange plate 60. The thermal exchange plates 60 may be considered part of the first battery array 48. Each of the thermal exchange plates 60 includes a plurality of channels 62 configured to communicate coolant C from the first space 56 to the second space 58. Further, the battery cells 25 are arranged relative to the thermal exchange plates 60, in this example, such that voids 64, 66 are provided above and below the battery cells 25. The voids 64, 66 are also configured to communicate coolant C from the first space to the second space 56, 58.

In an embodiment, the battery cells 25 are prismatic, lithium-ion cells. However, battery cells having other geometries (cylindrical, pouch, etc.), other chemistries (nickel-metal hydride, lead-acid, etc.), or both could alternatively be utilized within the scope of this disclosure. The battery cells 25 may include tabs 53 projecting into the first and second spaces 56, 58. The tabs 53 connect to corresponding busbar frames 55, as shown in FIG. 3.

In this disclosure, the battery pack 24 includes at least one volume filler configured to reduce the effective volume on the sides of the first and second battery arrays 48, 50. In turn, because the volume filler(s) take up excess volume within the enclosure assembly 30, the coolant C is directed efficiently within the volume 46 without the need for one or more dedicated manifolds. The volume fillers also reduce the amount of coolant C required in the battery pack 24, which reduces weight, among other benefits.

In this example, the battery pack 24 includes four volume fillers. With reference to FIGS. 2 and 3, a first volume filler 68 is arranged on a first side of the first and second battery arrays 48, 50, and a second volume filler 70 is arranged on a second side of the first and second battery arrays 48, 50. The battery pack 24 further includes a third volume filler 72 arranged on the first side of the first and second battery arrays 48, 50 and vertically beneath the first volume filler 68, and a fourth volume filler 74 arranged on the second side of the first and second battery arrays 48, 50 and vertically beneath the second volume filler 70.

Figure 5:
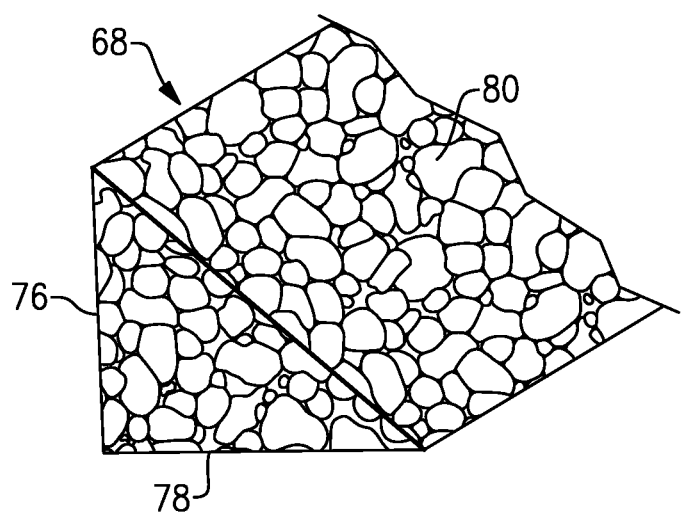
FIG. 5 is a perspective view of a portion of an example volume filler.

A portion of the first volume filler 68 is shown in FIG. 5. As shown, the first volume filler 68 exhibits a substantially triangular cross-section. Specifically, the first volume filler 68 includes a first face 76, a second face 78, and a third face 80. The first face 76 is configured to face the first space 56. The second face 78 is configured contact either a corresponding face of the third volume filler 72 or an intermediate frame 82, which is optionally attached to the enclosure assembly 30 vertically between the first and second battery arrays 48, 50. The third face 80 is inclined at an angle corresponding to the angled section 38. As such, the first volume filler 68 closely fits relative to the angled section 38, and thereby occupies some of the interior volume of the enclosure assembly 30 that is created by the angled section 38. It should be understood that the second, third, and fourth volume fillers 70, 72, 74 are configured substantially similar to the first volume filler 68. The first, second, third, and fourth volume fillers 68, 70, 72, 74 exhibit a length substantially equal to a length first and second battery arrays 48, 50.

In an aspect of this disclosure, the first and third volume fillers 68, 72 are sized and shaped so as to fill a majority of a volume defined by the angled sections 38 of the first and second portions 32, 34 on the first side of the first and second battery arrays 48, 50. Likewise, the second and fourth volume fillers 70, 74 are arranged to fill a majority of a volume defined by the angled sections 38 of the first and second portions 32, 34 on the second side of the first and second battery arrays 48, 50.

The first, second, third, and fourth volume fillers 68, 70, 72, 74 are made of a material that acts to keep coolant C within the first and second spaces 56, 58 without that fluid entering the first, second, third, and fourth volume fillers 68, 70, 72, 74. In an example, the first, second, third, and fourth volume fillers 68, 70, 72, 74 are made of a closed cell foam, such as an expanded closed cell foam. The first, second, third, and fourth volume fillers 68, 70, 72, 74 are made of a closed cell metal foam, such as a closed cell aluminum foam, in one particular example. The first, second, third, and fourth volume fillers 68, 70, 72, 74 may be formed by molding. The first, second, third, and fourth volume fillers 68, 70, 72, 74 are not formed of an open cell foam.

The first, second, third, and fourth volume fillers 68, 70, 72, 74 provides a shorter and more efficient flow path for the coolant C compared to when the first, second, third, and fourth volume fillers 68, 70, 72, 74 are not present. Further, the first, second, third, and fourth volume fillers 68, 70, 72, 74 allow the first and second portions 32, 34 to be readily and conveniently formed by stamping. In addition, the first, second, third, and fourth volume fillers 68, 70, 72, 74 can readily absorb loads applied to a side of the electrified vehicle 12.

The coolant C may be a non-conductive coolant C, such as a dielectric fluid designed for immersion cooling the battery cells 25. One suitable non-conductive fluid is a Novek™ engineered fluid sold by 3M™. However, other non-conductive fluids may also be suitable, and the actual chemical make-up and design characteristics (e.g., dielectric constant, maximum breakdown strength, boiling point, etc.) may vary depending on the environment the array 48 is to be employed within. Unlike the conductive glycol utilized within known cold plate systems, the non-conductive fluid received inside the immersion cooled battery arrays of this disclosure allows for direct contact with the battery cells and other electrified components without causing electrical shorts, thereby improving cooling and performance. The exemplary immersion cooling strategies further enable high rate charging and discharging and allow for high load demands without increasing the hardware size of the battery arrays.

It should be understood that terms such as "about," "substantially," and "generally" are not intended to be boundaryless terms, and should be interpreted consistent with the way one skilled in the art would interpret those terms. It should also be understood that directional terms such as "upper," "top," "vertical," "forward," "rear," "side," "above," "below," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery pack, comprising:
an enclosure assembly defining a volume;
a battery array within the volume, wherein the battery array includes a plurality of battery cells; and a volume filler within the volume, wherein the volume filler is disposed on a side of the battery array and is spaced-apart from the side of the battery array to provide a space for coolant to flow.

2. The battery pack as recited in claim 1, wherein the volume filler is made of a closed cell foam.

3. The battery pack as recited in claim 2, wherein the volume filler is made of a closed cell metal foam.

4. The battery pack as recited in claim 1, wherein the battery array is a first battery array, and wherein a second battery array is within the volume.

5. The battery pack as recited in claim 4, wherein the first battery array is vertically above the second battery array.

6. The battery pack as recited in claim 5, wherein:
the volume filler is a first volume filler and is arranged on a first side of the first and second battery arrays, and
the battery pack includes a second volume filler arranged on a second side of the first and second battery arrays.

7. The battery pack as recited in claim 6, wherein:
the battery pack includes a third volume filler arranged on the first side of the first and second battery arrays and vertically beneath the first volume filler,
the battery pack includes a fourth volume filler arranged on the second side of the first and second battery arrays and vertically beneath the second volume filler,
the first and third volume fillers are spaced-apart from the first side of the first and second battery arrays to provide a first space for coolant to flow, and
the second and fourth volume fillers are spaced-apart from the second side of the first and second battery arrays to provide a second space for coolant to flow.

8. The battery pack as recited in claim 7, wherein the battery array is configured to permit fluid to flow from the first space to the second space.

9. The battery pack as recited in claim 8, wherein:
the battery pack includes a plurality of thermal exchange plates arranged between some of the battery cells within the first and second battery arrays, and
the thermal exchange plates include channels configured to permit fluid to flow from the first space to the second space.

10. The battery pack as recited in claim 8, wherein:
the first and second battery arrays are arranged such that there are voids adjacent tops or bottoms of the battery cells within the first and second battery arrays, and
the voids to permit fluid to flow from the first space to the second space.

11. A battery pack, comprising:
an enclosure assembly defining a volume and comprising a first portion and a second portion connected to the first portion, wherein the first portion and the second portion each include a main section, an angled section projecting from an edge of the main section, and a rim projecting from an edge of the angled section;
a battery array within the volume, wherein the battery array includes a plurality of battery cells; and
a volume filler within the volume, wherein the volume filler includes a face inclined at an angle corresponding to an incline of the angled section, and wherein the volume filler is arranged such that the face of the volume filler is adjacent the angled section.

12. The battery pack as recited in claim 11, wherein the first portion and the second portion are connected by welding respective rims to one another.

13. The battery pack as recited in claim 11, wherein;
the battery array is a first battery array and a second battery array is within the volume,
the volume filler is a first volume filler, and the battery pack includes second, third, and fourth volume fillers,
the first, second, third, and fourth volume fillers exhibit a triangular cross-section,
the first, second, third, and fourth volume fillers exhibit a length substantially equal to a length of the first and second battery arrays,
the first and third volume fillers are arranged to fill a majority of a volume defined by the angled sections of the first and second portions on a first side of the first and second battery arrays, and
the second and fourth volume fillers are arranged to fill a majority of a volume defined by the angled sections of the first and second portions on a second side of the first and second battery arrays opposite the first side.

14. A method, comprising:
communicating fluid through an enclosure assembly of a battery pack to thermally condition a battery array,
wherein the battery pack includes a plurality of battery cells,
wherein the enclosure assembly defines a volume,
wherein the battery array is within the volume,
wherein a volume filler is within the volume, and
wherein the fluid is communicated through a space defined at least in part by an interior surface of the enclosure assembly, a side of the volume filler, and sides of the battery cells.

15. The method as recited in claim 14, wherein the volume filler is made of a closed cell metal foam.

16. The method as recited in claim 14, wherein the battery array is a first battery array, and wherein a second battery array is within the volume.

17. The battery pack as recited in claim 1, further comprising an inlet and an outlet, and wherein the battery pack is in communication with a source of coolant and is configured such that coolant can flow from the inlet, through the space, and to the outlet.

18. The battery pack as recited in claim 1, wherein the space is defined at least in part by an interior surface of the enclosure assembly, a side of the volume filler, and sides of the battery cells.

* * * * *